United States Patent [19]

Schneider

[11] 3,752,905

[45] Aug. 14, 1973

[54] GAMMA CONTROL IN THE LUMINANCE CHANNEL OF A COLOR TELEVISION TRANSMITTER

[76] Inventor: Hans-Dieter Schneider, Am Bruckelchen 6, Gross-Gerau, Germany

[22] Filed: Dec. 15, 1971

[21] Appl. No.: 208,337

[30] Foreign Application Priority Data

Dec. 16, 1970 Germany .................. P 20 61 952.7

[52] U.S. Cl. ........................ 178/5.4 R, 178/DIG. 16

[51] Int. Cl. ............................................ H04n 9/53

[58] Field of Search .............................. 178/DIG. 16

[56] References Cited

UNITED STATES PATENTS

| | | | |
|---|---|---|---|
| 2,255,691 | 9/1941 | Wilson | 178/DIG. 16 |
| 2,326,907 | 8/1943 | Wendt | 178/DIG. 16 |
| 2,884,484 | 4/1959 | Deichert | 178/DIG. 16 |
| 3,187,095 | 6/1965 | Rappold | 178/DIG. 16 |
| 3,104,281 | 9/1963 | Wolff | 178/7.5 DC |

FOREIGN PATENTS OR APPLICATIONS

| | | | |
|---|---|---|---|
| 1,086,533 | 10/1967 | Great Britain | 178/DIG. 16 |

*Primary Examiner*—Robert L. Griffin
*Assistant Examiner*—George G. Stellar
*Attorney*—Michael S. Striker

[57] ABSTRACT

The invention relates to a method and apparatus for transmitting a television picture signal having a high contrast range. The method involves integrating at least a portion of the television picture signal to obtain a test signal. The test signal is sensed by a threshold circuit which generates a control signal when the test signal approaches or exceeds a threshold level. The television picture signal is also simultaneously transmitted through two parallel channels, one channel including a linear amplifier and the other channel including a gamma amplifier having a changeable gain characteristic. The control signal, generated in response to the test signal exceeding the threshold level, modifies the gain characteristic of the gamma amplifier to increase the amplification of the signal corresponding to the picture in the shaded areas and reducing the amplification of the signal corresponding to the picture in the light areas. The output of the two channels are then combined in a mixer prior to transmission. An apparatus is disclosed for carrying out the method.

12 Claims, 2 Drawing Figures

GAMMA CONTROL IN THE LUMINANCE CHANNEL OF A COLOR TELEVISION TRANSMITTER

BACKGROUND OF THE INVENTION

The present invention relates to a method of transmitting television pictures, and in particular those having large contrast ranges.

Difficulties arise when taking or transmitting television pictures with a large contrast range, as the television camera tubes hitherto available for this purpose can only transmit a contrast of about 1:40. As is known, the contrast so quantitatively defined is the ratio or proportion of white to black in a television picture. This results in poor picture quality, for example, when, in outside shooting, a face is to be televised against a bright sky without it being possible to generate additional light. Similar difficulties can also arise in a television studio if the person to be televised is wearing predominantly white clothing.

The main cause of such a poor picture quality is that the so-called gamma stages which are normally used in the television cameras for contrast distortion are set to gamma value of 0.5 The corrections which are usually employed, for example reduced contrast in the shaded areas, are intended for the most frequently encountered conditions, namely the so-called normal scenes. This is necessitated by the fact that the transmittable contrast range depends on the signal-to-noise ratio of the video signal. Consequently, the actual effective correction curve of the so-called gamma stage differs from the theoretically correct curve in many cases.

If the above-mentioned picture faults are to be reduced, the gamma curve could be more severely curved in the region of the light areas, that is to say, the contrast in this region could be reduced. In that case, however, reproduction of the so-called normal scenes is impaired.

SUMMARY OF THE INVENTION

Accordingly, it is an object of the present invention to provide a method and apparatus for transmitting a television picture signal which does not have the disadvantages of the prior art.

It is another object of the present invention to provide a method and apparatus for transmitting a television picture signal corresponding to television pictures having large contrast ranges.

It is still another object of the present invention to provide a method and apparatus for transmitting a television picture signal corresponding to pictures having large contrast ranges, without having to accept an unfavorable compromise for pictures with normal contrast.

It is a further object of the present invention to provide a method and apparatus for transmitting a television picture signal which permits the adjustment of the gamma stage when the means value of the television signal substantially corresponds to that value for "white."

It is still a further object of the present invention to provide a method and apparaus for transmitting a television picture signal which makes it possible to adjust the gamma stage when the mean value of the television signal substantially equals the mean value for the signal corresponding to "black."

According to the present invention, a method of transmitting a television picture signal, of a television picture having a high contrast range, includes the step of processing at least a portion of said television picture signal to obtain a test signal. The test signal is then compared to a predetermined level. A control signal is generated when a predetermiend relationship arises between said test and predetermined level. Upon the generation of the control signal, the amplification of the signal corresponding to the picture in the shaded areas is increased and the amplification of the signal corresponding to the picture in light areas is reduced by means of the control signal.

According to a presently preferred embodiment, processing said signal comprises integrating said picture signal portion over a predetermined time to obtain its mean value. The predetermined level is a pre-selected threshold voltage, and the step of comparing comprises determining when said test signal exceeds said threshold voltage. Increasing and reducing the amplification of said signal comprises splitting the latter for amplification in two parallel paths, said amplification being linear in one path and non-linear in the other path. The non-linear amplification is controlled by means of the control signal. The amplfieid signals eminating from the respective parallel paths are combined in a mixer having adjustable means for selecting the ratio of combinations of said two signals. Also, the step of increasing the amplification of the picture signal corresponding to the shaded areas and reducing the amplification of the signal corresponding to the picture in the light areas respectively comprises controlling with said control voltage, the correction characteristic curve of a transmitter gamma stage.

In the case of a television picture which is generated by a color picture camera in which the luminosity and the chrominance signals are transmitted by way of separate channels, the step of increasing and reducing the amplification of said signal only takes place in the channel transmitting said luminosity signals.

An apparatus for carrying out the above method is described which includes processing means for processing at least a portion of said television picture signal to obtain a test signal. Comparing means are provided for comparing said test signal to a predetermined level and generating a control signal when a predetermined relationship arises between said test and predetermined level. Amplification means are provided for increasing the amplification of the signal corresponding to the picture in the shaded areas and reducing the amplification of the signal corresponding to the picture in the light areas by means of said control signal.

According to a presently preferred embodiment, the apparatus further includes signal mixing means. The amplification means comprises two parallel channels for supplying the television picture singal to the signal mixing means, one of said channels including linear amplification means, and the other channel including non-linear amplification means. The processing means comprises an integrating circuit located in a third parallel channel generating a mean value of the television signal portion which comprises a test signal. The comparing means consist of a threshold circuit means connected to said integrating means and to said non-linear amplification means, said non-linear amplification means having a changeable gain characteristic and responding to a predetermined threshold voltage at the output of said integrating means for changing the gain characteristics of said non-linear amplification means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Generally, the present invention involves sampling the high contrast television picture signal and extracting a portion thereof for processing. In particular, the sampled portion is integrated to yield the mean value of the extracted portion. The mean value is then compared in a threshold circuit which is sensitive to a predetermined level which, when exceeded, controls the correction function of a so-called gamma stage in such a way that the amplification is increased in the region of the shaded areas and reduced in the region of the light areas. Thus, the steepness of the correction curve of the gamma stage is reduced in the region of the light areas.

Gamma is the name given to the relationship in brightness which various shades of grey will have on a given picture tube. Normally, equal increments of the signal voltage at the grid of a kinescope does not produce equal increments of brightness near the maximum brightness point. This is due to the non-linear grid plate characteristic of the picture tube. Although gamma errors in monochrome receivers are not as serious a problem as in color receivers, some correction is usually desired. As for some other errors which originate during transmission or reception, these are compensated for at the transmitter. By pre-distorting the signal before it is transmitted, it is possible to compensate for some of the non-linearities in the system, especially in the camera tubes. As is well known, gamma amplifiers are essentailly amplifiers with a nonlinear element as plate or grid load. By choosing the appropriate amplification characteristics, the amplitude response of the circuit can be adjusted so that larger grid signals get more amplification than smaller ones. The term gamma, when referred to television art, refers to the exponent of that power law which is used to approximate the curve of the output magnitude vs. the input magnitude over the region of interest in the gamma amplifier.

Figure 1:
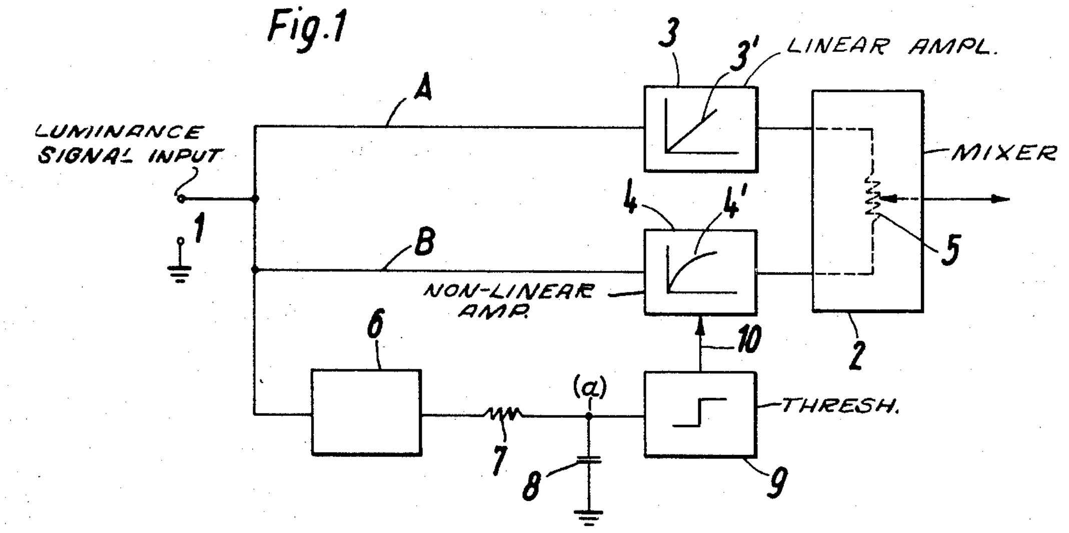
FIG. 1 is a block diagram, partially in schematic, showing one embodiment of a transmitting apparatus in accordance with the present invention.

Now referring to FIG. 1, showing the presently preferred circuit arrangement for carrying out the method according to the invention, input terminal 1 is provided for the application of the television picture signal to the circuit for correction in a manner to be described.

The television signal is passed by way of two parallel channels A and B to a mixer 2.

A linear amplifier is provided in channel A, said amplifier having a linear gain control characteristic 3' as shown. This gain characteristic is a pictorial representation of the output magnitude verses the input magnitude curve for the amplifier.

In the B channel, a gamma amplifier 4 is provided which has a non-linear gain characteristic curve, symbollically shown by curve 4'. According to the presently preferred embodiment, the gamma stage 4 includes input means for changing the gamma, as described above, both at low and high input magnitudes.

The outputs of the linear amplifier 3 and the gamma amplifier 4 are combined in the mixer 2. The signals eminating from the channels A and B are mixed in an selectively adjustable ratio. This is accomplished by providing a potentiometer 5 which has a variably selective tap. By displacing the tap, the effective gamma of the combined picture signals content can be selectively adjusted within wide limits.

The control of the characteristic curve of the gamma amplifier 4 is accomplished by providing a third parallel channel as is shown in FIG. 1. This channel connected to the input terminal 1 includes a separating stage 6, which may precondition the television picture signal prior to integration. The separating stage 6 is connected to an integrator which comprises a resistor 7 and a capacitor 8 connected to the reference potential or the circuit ground. The output of the integrating circuit appears at the junction (a), said junction being connected to a threshold circuit 9. The threshold circuit 9 is sensitive to the voltage levels appearing at the junction point (a). The threshold circuit 9 has associated with it a threshold value or values which it can compare with the voltages appearing at the junction point (a). Preferably, the threshold level of the threshold circuit 9 is adjustable over a larger range of values to thereby make the circuit more flexible as to be described.

The threshold circuit 9 is also connected to the gamma amplifier 4 via the lead 10.

The operation of the apparatus thus far described is as follows:

When a television picture signal is applied to the input terminals 1, the signal is divided into three separate portions, one going into a respective parallel channel as shown. It will be assumed that the threshold circuit 9 has a predetermined threshold voltage which is selected to transmit desired television signals as to be described. Thus, with the tap of the potentiometer 5 set in an intermediate position, the television signal entering the channels A and B are respectively amplified in the linear amplifier 3 and the gamma amplifier 4. The outputs of these two amplifiers are then combined or mixed in the mixer 2. The signal in this condition, eminating from the tapped potentiometer 5, will have an effective gamma which is a function of the combination of the two signals from the two amplifiers. With the potentiometer 5 fixed, the effective gamma of the apparatus will remain substantially constant so long as the gamma values of the gamma amplifier 4 are left undisturbed.

While the television signals are being amplified in channels A and B, a portion thereof is passed through the separating stage 6 and integrated in the integrator consisting of the resistor 7 and the capacitor 8. The resulting voltage at the junction point (a) will represent the mean value of the portion of the television picture signal which is sampled by this branch or channel. As long as the mean value of the signal portion integrated is below the threshold value of threshold circuit 9, the characteristic curve of the gamma amplifier 4 remains substantially constant, and so the effective gamma of the combined signals of the output of the mixer 2 likewise remain constant. However, when the mean value of the integrated signal portion at the junction point (a) approaches and exceeds the threshold value, a control voltage is generated by the threshold circuit 9 which modifies, via the lead 10, the characteristic curve of the gamma amplifier 4. This control voltage provides that amplification in the region of the shaded areas is increased, but reduced in the region of light areas, in the gamma amplifier 4.

The mean value of the incoming signals is formed in the capacitor 8 over a predetermined time, preferably over a few picture periods or frames.

As suggested above, the gamma correction is especially important in color television transmission. However, it is desirable that in a color picture camera in which the luminosity signals (luminance) and the color content signals (chromanance) are transmitted by way of separate channels, that the control of the correction function of the gamma stage 4 is carried out substantially or only in the channel of the luminosity signal. Also, it is preferred that the sample is only taken from the luminance channel. This reliably assures that the control of the effective gamma does not adversely effect the hue or the color tones in the chrominance channel.

With the above-described apparatus, the integrating circuit effectively monitors the relative magnitudes of the television picture signal. When the mean value approaches or exceeds a predetermined threshold value as described above, the control voltage is produced which controls the characteristic curve of the gamma stage 4. The gamma stage is connected into one of the parallel signal paths, in such a way that when the signal mean value produced by integration approximates the signal value which correspond to "white," the number of distinguishable degrees of luminosity in the light areas is increased. This, as explained above, is accomplished by utilizing the control signal to increase the amplification of the television signals in the region of the shaded areas and reducing the amplification in the regions of the light areas.

In many cases, it may be desirable for the number of distinguishable degrees of luminosity in the shaded areas to be increased when the mean value produced by integration approaches the signal value corresponding to "black." In this case, the threshold circuit 9 must be appropriately adjusted to obtain a corresponding threshold value.

Figure 2:
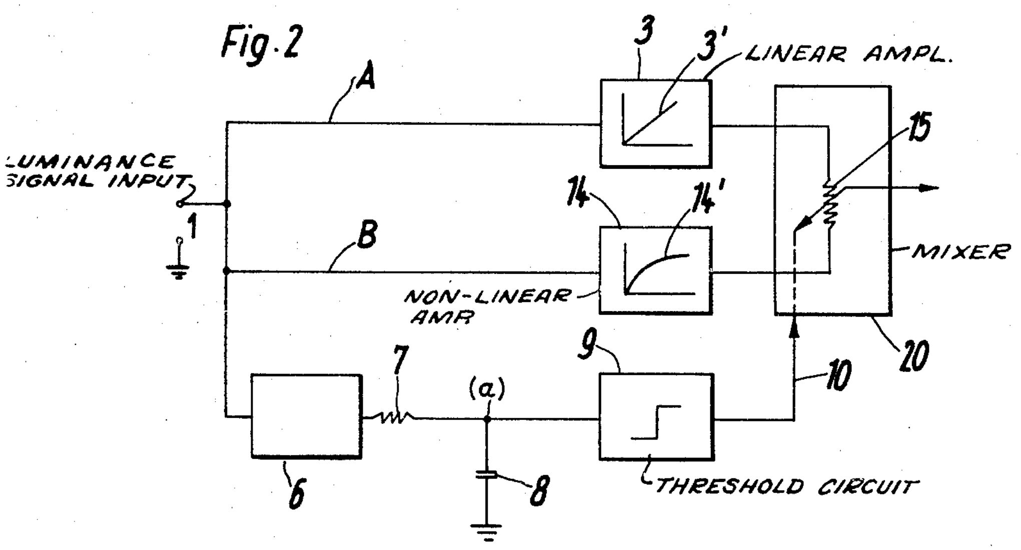
FIG. 2 is a block diagram, partially in schematic, showing another embodiment of the apparatus shown in FIG. 1.

As described above, the characteristic curve of the gamma amplifier 4 is modified, in the presently preferred embodiment, upon the generation of a control signal as described above. The effective gamma for the apparatus is modified by changing the characteristic curve of this amplifier since it, together with the linear amplifier 3, provide the inputs to the mixer 2. Thus, by virtue of contributing to this combination, the gamma amplifier 4 effects the overall apparatus gamma at the output of the potentiometer 5. Instead of controlling the characteristic curve of the gamma stage or amplifier 4, which is connected into one of the signal channels, it is also possible to apply the control voltage from the threshold circuit 9 to the mixer 20 as shown in FIG. 2. In this embodiment, a modification of the apparatus as shown in FIG. 1, the characteristic curve 14' of the gamma amplifier 14 remains unaltered, the control voltage being used to influence the ratio of the signals in the signal mixer 20, which signals are transmitted by way of the two signal paths A and B with linear and non-linear amplitude characteristics as described above.

The control signal eminating from the threshold circuit 9 and transmitted to the mixer 20 via the lead 10 is formed in the same manner as with the arrangement shown in FIG. 1. Thus, the control signal is formed when the test signal at the junction (a) exceeds the threshold value of the threshold circuit 9. However, now instead of influencing the apparatus gamma by modifying the characteristic curve of the gamma amplifier, the characteristic curve of the gamma stage remains fixed while the control voltage is utilized to influence the ratio of the signals transmitted from each of the parallel paths A and B. However, the results are substantially the same since, as suggested above, the effective gamma of the apparatus can be modified by changing the ratio by which the linearly amplified and the non-linearly amplified signals are combined in the mixer.

The invention has been described and illustrated in the FIGS. with reference to block circuit diagrams, since the individual circuits comprising the invention are well known and the details are not necessary for a comprehension of the invention. For this reason, such details have been omitted for the sake of clarity.

It will be understood that each of the elements described above, or two or more together, may also find a useful application in other types of television signal transmitting apparatus differing from the types described above.

While the invention has been illustrated and described as embodied in a method and apparatus for transmitting a television signal, the television picture having a high contrast range, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method for transmitting a color television picture signal having a high contrast range and having a luminance signal transmitted over a luminance channel and chrominance signals transmitted over chrominance channels, comprising, in combination, the steps of processing at least a portion of said luminance signal to obtain a test signal; furnishing a threshold signal; comparing said test signal to said threshold signal and generating a control signal when said test signal exceeds said threshold signal; and increasing the amplification of a portion of the luminance signal corresponding to the picture in the shaded areas and reducing the amplification of the portion of the luminance signal corresponding to the picture in the light areas in dependence on said control signal, while maintaining the amplification in said chrominance channels independent of said control signal.

2. A method as defined in claim 1, wherein processing comprises integrating said luminance signal over a predetermined time to obtain its mean value.

3. A method as defined in claim 1, wherein increasing the amplification of the luminance signal corresponding to the shaded areas and reducing the amplification of the luminance signal corresponding to the picture in the light areas respectively comprises controlling, with said control voltage, the correction function of the transmitter gamma stage.

4. A method as defined in claim 1, wherein processing comprises integrating said luminance signal portion over a plurality of picture frames.

5. A method as defined in claim 1, wherein the steps of increasing and reducing the amplification of luminance signal comprises splitting the latter for amplification in two parallel paths, said amplification being linear in one path and non-linear in the other path, and controlling said non-linear amplification with said control signal.

6. A method as defined in claim 5, further including the step of combining the amplified outputs from said parallel paths, and adjusting the relative proportion in which the outputs are combined to thereby vary the amount of amplification of the luminance signal corresponding to the shaded areas and to the light areas.

7. Apparatus for transmitting a color television picture signal having a high contrast range and having a luminance signal transmitted over a luminance channel and chrominance signals transmitted over chrominance channels, comprising, in combination, processing means for processing at least a portion of said luminance signal to obtain a test signal; threshold circuit means connected to said processing means for furnishing a control signal when said test signal exceeds a predetermined threshold signal; amplification means in said luminance channel, said amplification means having a predetermined characteristic curve; varying means in said amplification means for increasing the amplification of said luminance signal corresponding to the picture in the shaded areas and reducing the amplification of said luminance signal corresponding to the picture in the light area in dependence upon said control signal; and amplification means in said chrominance channel, operative for processing said chrominance signals in accordance with predetermined characteristic curves independent of the contrast range in said picture.

8. Apparatus as defined in claim 7, further comprising signal mixing means; and wherein said amplification means in said luminance channel comprises two parallel channels for supplying said luminance signal to said signal mixing means, one of said channels including linear amplification means, the other of said channels including non-linear amplification means.

9. Apparatus as defined in claim 8, wherein said processing means comprises a third parallel channel including integrating means for generating a mean value of said luminance signal portion which comprises said test signal.

10. Apparatus as defined in claim 9, wherein said signal mixing means is adjustable; and wherein said threshold circuit means responds to a predetermined threshold voltage at the output of said integrating means for changing the ratio of the signals transmitted by way of each of said two channels, respectively, having linear and non-linear amplification characteristics.

11. An apparatus as defined in claim 9, wherein said non-linear amplification means comprises a gamma stage having a variable characteristic curve, said threshold value being selected so that when said mean value of said luminance signal portion corresponds to a corresponding value for "white," said characteristic curve is changed to increase the number of distinguishable degrees of luminosity in the light areas.

12. An apparatus as defined in claim 9, wherein said non-linear amplification means comprises a gamma stage having a variable characteristic curve, said threshold value being selected so that when said mean value of said television signal portion corresponds to a corresponding value for "black," said characteristic curve is changed to increase the number of distinguishable degrees of luminosity in the shaded areas.

* * * * *

UNITED STATES PATENT OFFICE
CERTIFICATE OF CORRECTION

Patent No. 3,752,905 Dated August 14, 1973

Inventor(s) Hans-Dieter Schneider

It is certified that error appears in the above-identified patent and that said Letters Patent are hereby corrected as shown below:

On the cover sheet insert -- [73] Assignee: Robert Bosch Fernsehanlagen GmbH, Darmstadt, Germany --.

Signed and sealed this 2nd day of April 1974.

(SEAL)
Attest:

EDWARD M.FLETCHER,JR.
Attesting Officer

C. MARSHALL DANN
Commissioner of Patents